(12) United States Patent
Matteson et al.

(10) Patent No.: US 8,572,970 B2
(45) Date of Patent: Nov. 5, 2013

(54) METHOD AND APPARATUS FOR STARTING A REFRIGERANT SYSTEM WITHOUT PREHEATING THE OIL

(75) Inventors: Peter S. Matteson, South Windsor, CT (US); Sean P. Breen, Holyoke, MA (US)

(73) Assignee: United Technologies Corporation, Hartford, CT (US)

( * ) Notice: Subject to any disclaimer, the term of this patent is extended or adjusted under 35 U.S.C. 154(b) by 727 days.

(21) Appl. No.: 12/670,724

(22) PCT Filed: Jul. 27, 2007

(86) PCT No.: PCT/US2007/016945
§ 371 (c)(1),
(2), (4) Date: Jan. 26, 2010

(87) PCT Pub. No.: WO2009/017474
PCT Pub. Date: Feb. 5, 2009

(65) Prior Publication Data
US 2010/0205966 A1 Aug. 19, 2010

(51) Int. Cl.
*F01K 13/02* (2006.01)
(52) U.S. Cl.
USPC ............................................. 60/646; 60/671
(58) Field of Classification Search
USPC ........... 60/646, 651, 671, 693, 434, 611, 616, 60/622; 184/6.11, 6.16, 6.26
See application file for complete search history.

(56) References Cited

U.S. PATENT DOCUMENTS

| | | | | |
|---|---|---|---|---|
| 3,103,917 A | * | 9/1963 | Bauer et al. | 122/1 R |
| 3,393,515 A | | 7/1968 | Tabor at al. | |
| 3,686,867 A | * | 8/1972 | Hull | 60/667 |
| 3,779,007 A | | 12/1973 | Lavash | |
| 5,584,193 A | * | 12/1996 | Biermann | 62/476 |
| 6,233,967 B1 | * | 5/2001 | Seewald et al. | 62/470 |
| 6,244,059 B1 | * | 6/2001 | Hill | 62/193 |
| 6,539,717 B2 | | 4/2003 | Kitz | |
| 6,834,514 B2 | | 12/2004 | Takeuchi et al. | |
| 7,146,813 B2 | * | 12/2006 | Brasz et al. | 60/651 |
| 7,174,716 B2 | | 2/2007 | Brasz et al. | |
| 2006/0112692 A1 | * | 6/2006 | Sundel | 60/670 |

FOREIGN PATENT DOCUMENTS

JP  11223106 A  8/1999
JP  2004346824 A  12/2004

OTHER PUBLICATIONS

International Search Report and Written Opinion mailed Jan. 16, 2008, (9 pgs.).
International Preliminary Report on Patentability mailed Feb. 11, 2010, (6 pgs.).

* cited by examiner

*Primary Examiner* — Thomas Denion
*Assistant Examiner* — Shafiq Mian
(74) *Attorney, Agent, or Firm* — Carlson, Gaskey & Olds, P.C.

(57) ABSTRACT

A rankine cycle system, which includes a turbine for driving a generator by way of a gearbox having an oil sump, is adapted to have the oil heated relatively quickly by causing a mixture of hot refrigerant gases from the evaporator and the oil from the low portion of the turbine to be mixed in an eductor and flow to the oil sump for heating the oil.

2 Claims, 3 Drawing Sheets

METHOD AND APPARATUS FOR STARTING A REFRIGERANT SYSTEM WITHOUT PREHEATING THE OIL

TECHNICAL FIELD

This disclosure relates generally to organic rankine cycle systems and, more particularly, to a method and apparatus for starting such a system without preheating the lubricant.

BACKGROUND OF THE DISCLOSURE

The well known closed rankine cycle comprises a boiler or evaporator for the evaporation of a motive fluid, a turbine fed with vapor from the boiler to drive the generator or other load, a condenser for condensing the exhaust vapors from the turbine, and the apparatus, such as a pump, for cycling the condensed fluid to the boiler. Such a system is shown and described in U.S. Pat. No. 3,393,515.

With the advent of the energy crisis, and the need to conserve and to more effectively use the available energies, rankine cycle systems have been used to capture the so called "waste heat" or the energy from naturally occurring sources such as methane gas flares or geo-thermal heat sources. A turbine as applied for this purpose is shown and described in U.S. Pat. No. 7,174,716 assigned to the assignee of the present invention.

In order to start such a refrigerant system, the oil used to lubricate the bearing of the turbine must be heated to bring the temperature above the point where refrigerant will condense and displace the oil. This has traditionally been accomplished by using a heater which is effective in maintaining the temperature once it has been achieved but takes a relatively long time to do so. It is therefore desirable to substantially reduce the time for starting up such an organic rankine cycle system and possibly eliminate the need for an oil heater.

DISCLOSURE

Briefly, in accordance with one aspect of the disclosure, hot refrigerant vapor is drawn from a point downstream of the evaporator and upstream of the turbine inlet valve and routed to the eductor to draw oil from the turbine suction housing and pump a mixture of refrigerant vapor and oil to the oil sump to thereby heat the oil in the sump.

In the drawings as hereinafter described, a preferred embodiment is depicted; however, various other modifications and alternate constructions can be made thereto without departing from the spirit and scope of the disclosure.

DESCRIPTION

Figure 1:
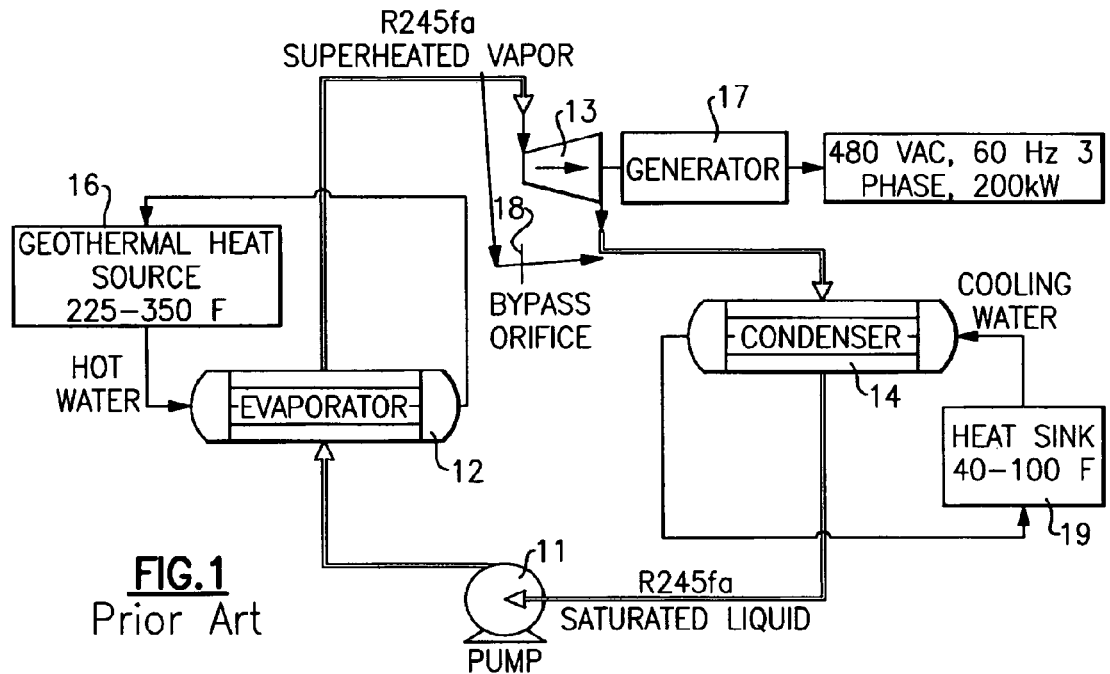
FIG. 1 is a schematic illustration of an organic rankine cycle system in accordance with the prior art.

Shown in FIG. 1 is an organic rankine cycle system of the type which is typically used for the purpose of using waste heat or natural occurring heat sources to generate electricity. It includes, in serial flow relationship, a pump 11, an evaporator 12, a turbine 13 and a condenser 14. The working fluid can be any suitable refrigerant such as R-245fa.

The heat source for heating the boiler or evaporator 12 can be any suitable source such as the exhaust of a gas turbine engine, methane gas flares, or a geo-thermal heat source providing hot water to the evaporator 12 as shown.

The turbine 13 is mechanically connected by way of a gear box (not shown) to a generator 16 for generating electricity. A bypass orifice 18 is provided to bypass the turbine 13 during start up of the system so that the temperature and pressure of the refrigerant can first rise to the desired level to ensure proper operation of the turbine 13.

The condenser 14 can be either air cooled or water cooled by way of a heat sink 19 as shown.

Figure 3:
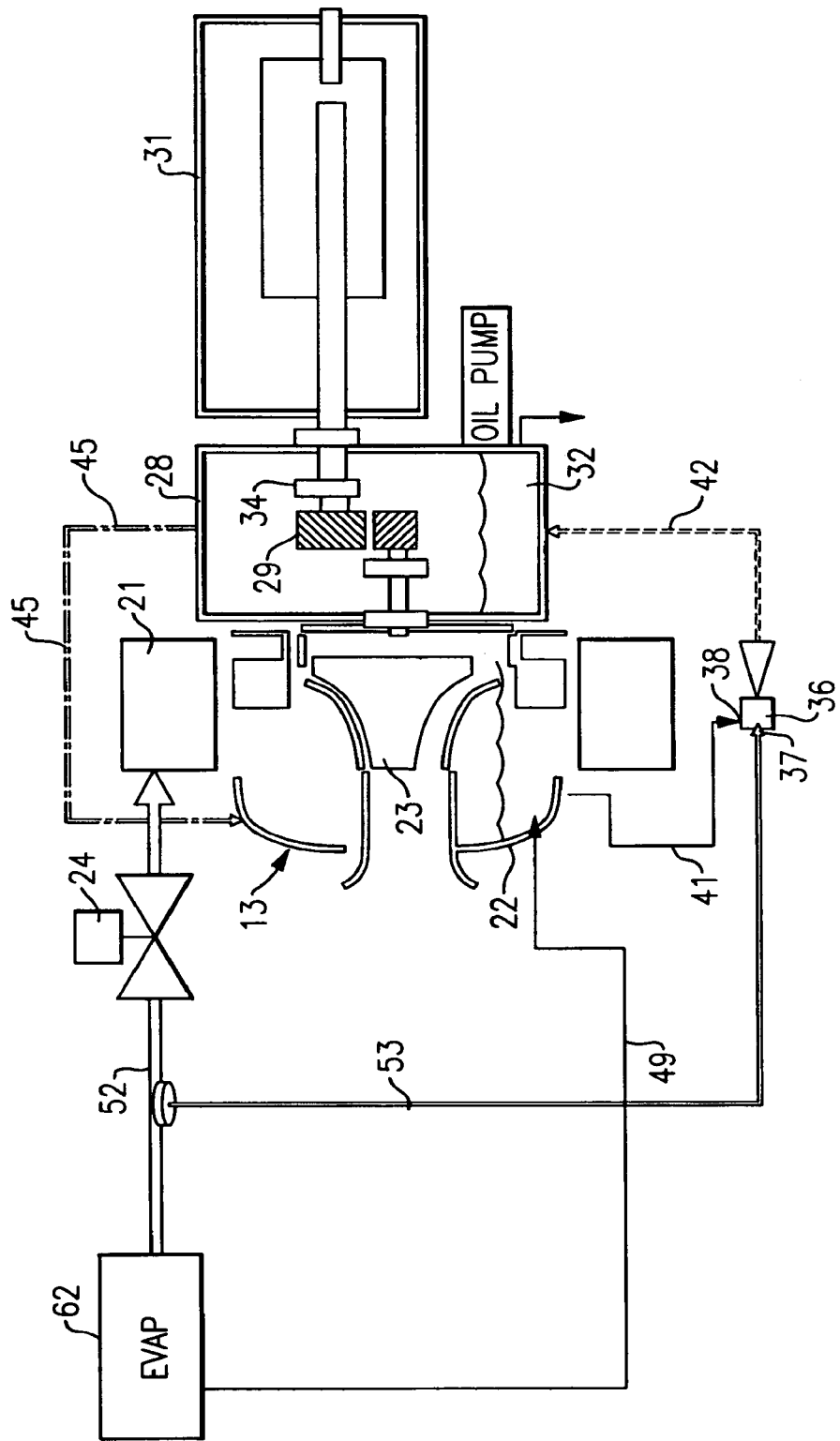
FIG. 3 is a schematic illustration thereof in accordance with the present disclosure.

A portion of the organic rankine cycle system is shown in FIG. 3 including the evaporator 12 and the turbine 13. The turbine 13 includes a high pressure volute 21, a suction housing 22 and an impeller 23 and may be of the type shown and described in U.S. Pat. No. 7,174,716 assigned to the assignee of the present application. A turbine inlet valve 24 fluidly interconnects the evaporator 12 to the high pressure volute 21.

In operation, refrigerant vapor is passed from the evaporator 12 through the turbine inlet valve 24 to the high pressure volute 21 and then passes through nozzles 26 to impart motive force to the impeller 23 to drive a shaft 27 in a gear box 28. The drive shaft 27 is then connected by gears 29 to drive a generator 31. The gear box 28 includes an oil sump 32 and an oil pump 33 to pump oil up to the gears 29 and the bearings 34 prior to being passed to the oil cooler (not shown).

Within the refrigerant flow circuit, oil tends to become emulsified within the refrigerant to provide a mixture of the two substances. Thus, within the suction housing 22, the oil tends to separate from the vapor and collect in the bottom portion of the suction housing 22 as shown. It is thus desirable to return this oil to the oil sump 32. This is accomplished by way of an eductor 36 having a primary flow inlet 37 and a secondary flow inlet 38. The primary flow inlet 37 is fluidly connected by line 39 to the high pressure volute 21, and the secondary flow inlet 38 is fluidly connected by line 41 to the lower portion of the suction housing 22 as shown.

In operation, the high pressure refrigerant vapor from the high pressure volute 21 passes along line 39 to the primary flow inlet 37 of the eductor 36 to thereby cause the secondary flow of oil from the suction housing 22 to flow through line 41 and into the secondary flow inlet 38, with the mixture then flowing along line 42 to the oil sump 32. The refrigerant vapor then rises in the gearbox 28 and is caused by pressure gradient to move to the suction housing 22 so as to flow from the gearbox 28 to the suction housing along line 45.

A mixture of refrigerant and oil also exists in the evaporator 12 with the oil passing along line 49 to the suction housing 22.

Traditionally, at system start up the oil in the sump 32 is cold and therefore and not in a suitable condition for proper circulation within the system. Accordingly, this problem has traditionally been addressed by the use of heater 51 which is placed within the oil sump 32 as shown. In one form, the heater 51 is an electrical heater which is capable of heating the oil in a relatively short period of time. However it is desirable to eliminate the waiting period that is necessary for this function and, if possible, eliminate the heater 51 altogether.

Referring now to FIG. 3, it will be seen that the high pressure volute 21 is no longer being applied to the primary flow inlet 37. Rather, hot refrigerant vapor is taken from line 52 at a point downstream of the evaporator 12 but upstream of the turbine inlet valve 24. This hot refrigerant vapor is routed along line 53 to the primary flow inlet 37. As before, the oil is drawn from the suction housing 22 and flows along line 41 to the secondary flow inlet 38. However, because of the hot refrigerant gas, the mixture of oil and refrigerant that flows along line 42 to the oil sump 32 is substantially increased in temperature (i.e. in the range of -). Accordingly, oil in the sump 32 is heated much more quickly then in the case of the prior art, thereby allowing a system to be started much earlier than before. The oil heater 51 of the prior art can therefore be eliminated.

Figure 4:
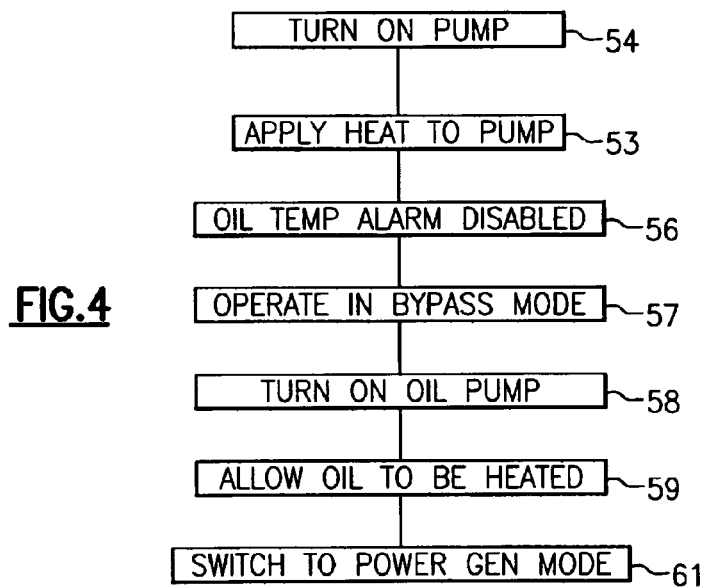
FIG. 4 is a flow diagram of the method in accordance with the present disclosure.
Figure 2:
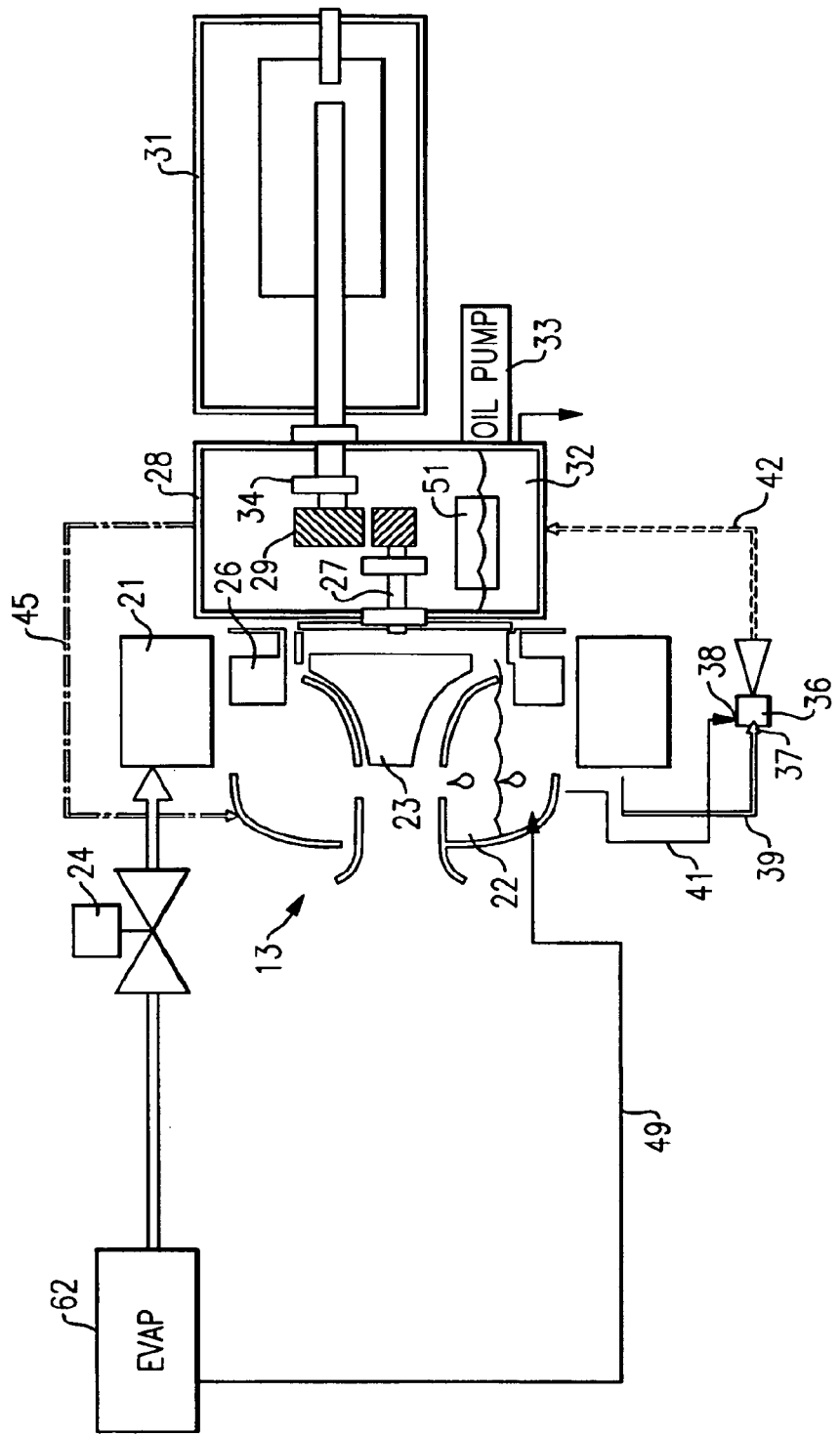
FIG. 2 is a schematic illustration of the turbine and generator portion thereof with the flow of oil indicated in accordance with the prior art.

Considering now the manner in which the system is started, the sequence of events is shown in FIG. 4. First, the pump 11 is turned on to circulate refrigerant through the system as shown in block 54. Then the geothermal heat source 16 is applied to heat the evaporator 12 as shown in block 55. The oil temperature alarms can be disabled as shown in block 56 since, even though the oil is cold at this point, the present system allows for start up of the system with these features as described hereinabove. Since the system must be in operation for a period of time before the vapor is superheated for proper operation of the turbine 13, the bypass orifice 18 is opened to allow circulation of the refrigerant through the system but around the turbine 13 as shown in block 57.

The oil pump 33 is then turned on as indicated at block 58 to circulate the oil within the system (i.e. within the gearbox 28 and the generator 31). The high temperature refrigerant leaving the evaporator 12 goes through the eductor 36 heating the oil being pumped from the suction housing 22 and then flowing to the sump 32 to heat the oil there as indicated at block 59. Once the oil reaches an appropriate temperature for the system to properly operate, the power plant is allowed to resume normal operation and switch to power generation mode as shown in block 61.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A rankine cycle system of the type having in serial flow relationship a pump, an evaporator, a turbine and a condenser, with the turbine being applied to drive a generator through a gearbox having an oil sump, comprising;
   an eductor with primary and secondary flow inlets;
   fluid connection between said secondary flow inlet and a lower portion of said turbine for conducting the flow of oil therein;
   fluid connection between an outlet of said evaporator and said primary flow inlet for conducting the flow of hot refrigerant gas therein; and
   fluid connection between an outlet of said eductor and said oil sump for conducting the flow of a mixture of oil and hot refrigerant gases therein.

2. The apparatus as set forth in claim 1 and including a turbine inlet valve upstream of said turbine and downstream from said evaporator, wherein said fluid connection from said evaporator is located upstream of said turbine inlet valve.

* * * * *